(12) United States Patent
Weng et al.

(10) Patent No.: US 6,463,596 B1
(45) Date of Patent: Oct. 15, 2002

(54) SIMPLE STRUCTURED WATER-SAVING DEVICE OF STOOL WATER BOX

(76) Inventors: Yeng-Jung Weng, No. 32, Lane 946, Dayou Rd., Taoyuan City (TW); Shu-Lian Weng, No. 6-3, Lane Fushou 8, Guangfeng St., Pingen City, Taoyuan Hsien (TW)

( * ) Notice: Subject to any disclaimer, the term of this patent is extended or adjusted under 35 U.S.C. 154(b) by 0 days.

(21) Appl. No.: 09/851,962

(22) Filed: May 10, 2001

(51) Int. Cl.⁷ .................................................. E03D 1/14
(52) U.S. Cl. ............................................................ 4/325
(58) Field of Search ........................... 4/324, 325, 392, 4/393, 403, 404, 415

(56) References Cited

U.S. PATENT DOCUMENTS 4,240,167 A * 12/1980 Gilliland ........................ 4/324
5,142,710 A * 9/1992 Olson ............................ 4/325
5,237,710 A * 8/1993 Battle ............................ 4/324

* cited by examiner

Primary Examiner—Charles E. Phillips
(74) Attorney, Agent, or Firm—Rosenberg, Klein & Lee

(57) ABSTRACT

A simple structured water-saving device of stool water box comprises: a toggle having an inner wall being formed with a plurality of strips; and a press firmly secured to one side of the toggle. The toggle is engaged to a lower end of a water drainage tube of a stool water box; and the press is adhered to a top of a plug of the water box. A chain is used to connect the plug with the flush handle. When the flush handle is pressed downwards, the plug will be pulled by the chain to be opened, so that the press bends through an angle and generates an elastic force. When the flush handle suffers from a force, the plug will seal the water outlet of the water box by an elastic force of the press. Therefore, the object of saving water is achieved.

3 Claims, 2 Drawing Sheets

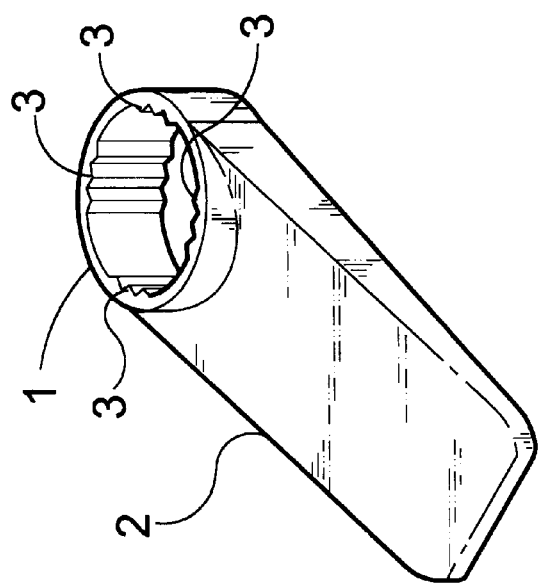
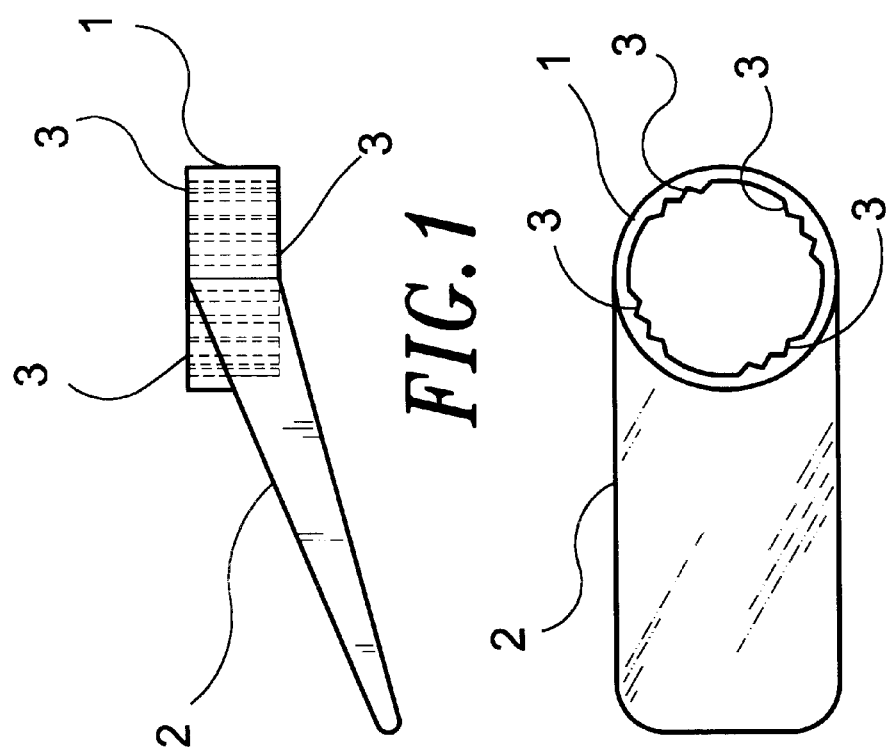

SIMPLE STRUCTURED WATER-SAVING DEVICE OF STOOL WATER BOX

FIELD OF THE INVENTION

The present invention relates to a simple structured water-saving device of stool water box, wherein the plug of the stool water box can be covered on the water outlet quickly so as to save water.

BACKGROUND OF THE INVENTION

A stool is formed by a stool body and a water box. The stool body collects an amount of excrement. Water in the water box is then used to flush the stool body so as to discharge the excrements out of the stool for being processed. Thus a clean environment is retained and a high quality of life is provided.

Every time the stool is used, water in the water box must be drained out completely. The water drainage is terminated by the application of a plug in the water box which seals the water outlet by gravitational force. However, this method causes a large amount of water to be wasted in that the time required for water flowing into the water box is long due to the fact that water must be completely drained before gravity can force the plug into the water outlet. It may be desirable, in some instances, to stop the flushing action early to save water, such as when only urine is collected in the stool.

Therefore, there exists a need for a novel flushing mechanism which has the function of controlling the water drainage so as to save water.

SUMMARY OF THE INVENTION

Accordingly, the primary object of the present invention is to provide a simple structured water-saving device of a stool water box, wherein the water drainage is controllable.

Another object of the present invention is to provide a simple structured water-saving device of stool water box, wherein it can be manufactured easily and has a lower cost.

A further object of the present invention is to provide a simple structured water-saving device of stool water box which can be maintained easily.

To achieve above objectives, the present invention provides a simple structured water-saving device of stool water box comprising a toggle having an inner wall being formed with a plurality of raised rib sections and a press firmly secured to one side of the toggle. The toggle is engaged to a lower end of a water drainage tube of a stool water box and the press is coupled to a top of a plug of the water box. A chain is used to connect the plug with the flush handle. When the flush handle is pressed downwards, the plug will be pulled by the chain to be opened, so that the press bends through an angle and generates an elastic force enacted on the plug. When the flush handle is released, the plug will seal the water outlet of the water box by the application of the elastic force of the press. Therefore, the objective of saving water is achieved.

The various objectives and advantages of the present invention will be more readily understood from the following detailed description when read in conjunction with the appended drawings.

BRIEF DESCRIPTION OF THE DRAWINGS

FIG. 1 is a cross sectional view of the simple structured water-saving device of stool water box of the present invention.

FIG. 2 is an upper view of the simple structured water-saving device of stool water box according to the present invention.

FIG. 3 is a schematic perspective view of the simple structured water-saving device of stool water box of the present invention.

DETAILED DESCRIPTION OF THE PREFERRED EMBODIMENTS

Figure 4:
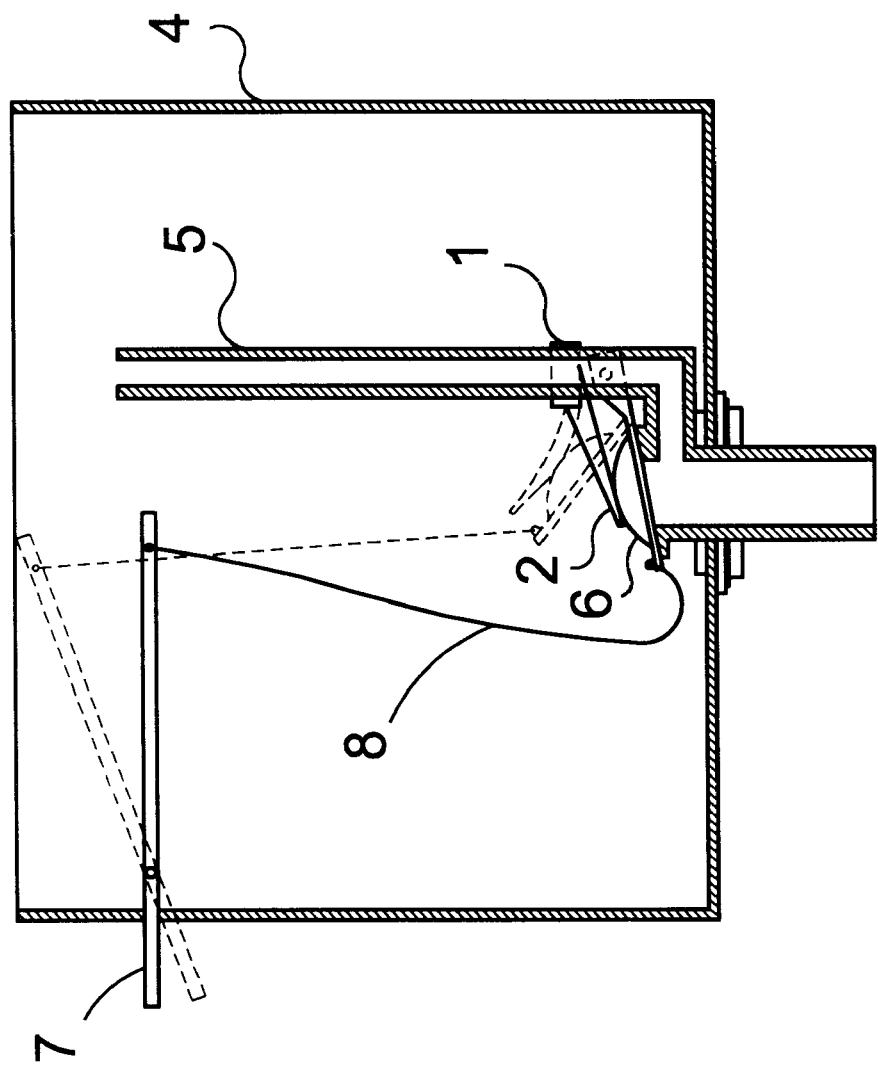
FIG. 4 is an assembled schematic view of the simple structured water-saving device of stool water box according to the present invention.

Referring to FIGS. 1 to 4, the simple structured water-saving device of stool water box of the present invention is illustrated. The simple structured water-saving device of stool water box has a toggle 1. One side of the toggle 1 is extended with a press 2. The press 2 is flat and elastic. The inner wall of the toggle 1 is formed with a plurality of raised rib sections 3, each of which having a plurality of triangular or semicircular indents formed thereon.

The rib sections 3 on inner wall of the toggle 1 can be engaged at the lower end of the drain water tube of the stool water box 4, thereby, the press 2 extending to one side of the toggle 1 resists against a top of a plug 6 of the water box 4. The plug 6 is connected to a chain 8. Another end of the chain 8 is connected to a flush handle 7 so that the flush handle 7 and plug 6 are operated synchronously. When the user applies a force to the flush handle 7 so that the flush handle 7 is pressed downwards, the chain 8 will cause plug 6 to be pulled and opened, thereby causing water in the water box 4 to drain from the stool through a water outlet. The press 2, pressing against the plug 6, bends through an angle due to the effect of the opening of the plug 6 by the chain 8 so as to generate an elastic force. When no force is applied to the flush handle 7, the plug 6 will seal the water outlet of the water box 4 by the elastic force of the press 2 so as to prevent the drainage of water thereby achieving the object of controlling the water drainage of the water box 4. Thus, if only urine is collected in the stool, only a small amount of water for flushing can be controlled by the user. Therefore, the present invention has the effect of saving water in the water box 4.

The simple structured water-saving device of stool water box of the present invention has the following advantages as compared with other prior art designs:

1. A press is installed at the top of the plug of the water box so that as the plug is opened, the press can bend downwards and apply an elastic force on the plug so as to seal the outlet. Thus, the object of saving water is achieved by controlling water drainage.
2. The present invention has a simple structure, can be assembled easily, and has a lower cost.

The present invention having been thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. In a toilet flushing system including a water reservoir, a discharge drain for discharging water from said water reservoir into a toilet bowl, a drain water tube extending in said water reservoir upwardly from said discharge drain, a plug secured to said drain water tube and removably applied to said discharge drain to close the same, a flush handle, and a chain extending between said flush handle and said plug to displace said plug from said discharge drain upon actuating of said flush handle by a user, a water saving device, comprising:

a toggle, said toggle having a cylindrically contoured wall and a plurality of raised rib sections integrally formed on an inner surface of said wall, each of said raised rib sections including a plurality of longitudinally extending indents formed thereon, said toggle being attached to said drain water tube above said plug, and said wall embracing said drain water tube with said raised rib sections in contact therewith, and an elastic press member extending from an external surface of said wall of said toggle;

said elastic press member applying elastic force towards said plug, thereby resisting displacement of said plug from said discharge drain, and thereby controlling the duration of displacement of said plug from said discharge drain in correspondence with the duration of actuating said flush handle.

2. The water-saving device, as claimed in claim 1, wherein said press member has a flat shape.

3. The water-saving device, as claimed in claim 1, wherein each of said indents on said raised rib sections of said toggle has a triangular shape.

* * * * *